US008885325B2

(12) United States Patent
Nagase et al.

(10) Patent No.: US 8,885,325 B2
(45) Date of Patent: Nov. 11, 2014

(54) LITHIUM ION CAPACITOR

(71) Applicant: Taiyo Yuden Co., Ltd., Tokyo (JP)

(72) Inventors: Takatoshi Nagase, Takasaki (JP); Koji Kano, Takasaki (JP); Takeo Tsuzuki, Takasaki (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 101 days.

(21) Appl. No.: 13/665,580

(22) Filed: Oct. 31, 2012

(65) Prior Publication Data
US 2013/0120909 A1    May 16, 2013

(30) Foreign Application Priority Data

Nov. 11, 2011 (JP) ................. 2011-247657

(51) Int. Cl.
*H01G 9/00* (2006.01)
*H01G 11/52* (2013.01)

(52) U.S. Cl.
CPC ........... *H01G 11/52* (2013.01); *Y02E 60/13* (2013.01)
USPC ........... 361/512; 361/502; 361/503; 361/504; 361/525; 361/528

(58) Field of Classification Search
CPC ....... H01G 11/06; H01G 11/28; H01G 11/52; H01G 9/155
USPC ................. 361/512, 502–504, 509, 516–519, 361/523–525, 528–530
See application file for complete search history.

(56) References Cited

U.S. PATENT DOCUMENTS 6,790,562 B2 * 9/2004 Harada et al. ................. 429/250

FOREIGN PATENT DOCUMENTS

| JP | H10-256088 A  | 9/1998  |
|----|---------------|---------|
| JP | H11-162788 A  | 6/1999  |
| JP | 2010-171211 A | 8/2010  |
| JP | 2010-171346 A | 8/2010  |
| JP | 2010-239028 A | 10/2010 |
| JP | 2010-245072 A | 10/2010 |
| JP | 2011-166043 A | 8/2011  |

OTHER PUBLICATIONS

Notice of Reasons for Refusal issued by Japanese Patent Office, mailed Oct. 15, 2013, for Japanese counterpart application No. 2011-247657.
Notice of Reasons for Refusal issued by Japanese Patent Office, mailed Jan. 22, 2014, for Japanese counterpart application No. 2011-247657.

* cited by examiner

*Primary Examiner* — Nguyen T Ha
(74) *Attorney, Agent, or Firm* — Law Office of Katsuhiro Arai

(57) ABSTRACT

An object of the present invention is to provide a way to reduce the internal resistance of a lithium ion capacitor without causing its capacity or withstand voltage to drop. The present invention provides a lithium ion capacitor having a positive electrode, a negative electrode, a separator, and an electrolyte solution, wherein the separator contains cellulose that has been given a treatment to create carbon-carbon double bonds.

12 Claims, 1 Drawing Sheet

LITHIUM ION CAPACITOR

BACKGROUND

1. Field of the Invention

The present invention relates to a lithium ion capacitor.

2. Description of the Related Art

Internal resistance of a lithium ion capacitor is a cause of energy loss when the capacitor is charged or discharged. Particularly with capacitors used for large-current discharge applications, their internal resistance has significant impact on capacitor characteristics. Many of the factors that increase the internal resistance of a capacitor are due to the electrode, electrolyte solution and separator constituting the capacitor. As a way to reduce the internal resistance of the capacitor, therefore, lowering the resistance of each capacitor member has been considered. Methods to lower the resistance of the electrode include adding a substance offering excellent conductive property to the electrode and controlling the electrode structure (refer to Patent Literature 1 and 2, for example). With these methods, however, it is difficult to maintain the original capacity without increasing the electrode thickness or capacitor size. As for lowering of the resistance of the electrolyte solution, on the other hand, an electrolyte solution offering good conductivity and a low-viscosity electrolyte solution have been considered (refer to Patent Literature 3, for example). However, solving the aforementioned problem with these methods is difficult because the withstand voltage characteristics and internal resistance of the capacitor are in a mutually exclusive relationship. Furthermore, film thickness reduction has been considered for the electrode and separator (refer to Patent Literature 4, for example). However, this method reduces operability in the manufacturing process because the member strength becomes weak.

Any discussion of problems and solutions involved in the related art has been included in this disclosure solely for the purposes of providing a context for the present invention, and should not be taken as an admission that any or all of the discussion were known at the time the invention was made.

PRIOR ART LITERATURES

Patent Literatures

[Patent Literature 1] Japanese Patent Laid-open No. 2010-171346
[Patent Literature 2] Japanese Patent Laid-open No. 2010-171211
[Patent Literature 3] Japanese Patent Laid-open No. 2010-245072
[Patent Literature 4] Japanese Patent Laid-open No. 2010-239028

SUMMARY

An object of the present invention is to provide a way to reduce the internal resistance of a lithium ion capacitor without causing its capacity or withstand voltage to drop.

After studying in earnest the inventors found that the aforementioned object could be achieved by using, as the separator, cellulose that has been given a treatment to create carbon-carbon double bonds, and completed the present invention. In other words, the present invention provides a separator for a lithium ion capacitor containing cellulose that has been given a treatment to create carbon-carbon double bonds. The present invention also provides a lithium ion capacitor having a positive electrode, a negative electrode, a separator, and an electrolyte solution, wherein the separator contains cellulose that has been given a treatment to create carbon-carbon double bonds.

According to the present invention, the internal resistance of a lithium ion capacitor can be reduced without causing its capacity or withstand voltage to drop.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DETAILED DESCRIPTION OF EMBODIMENTS

Figure 1:
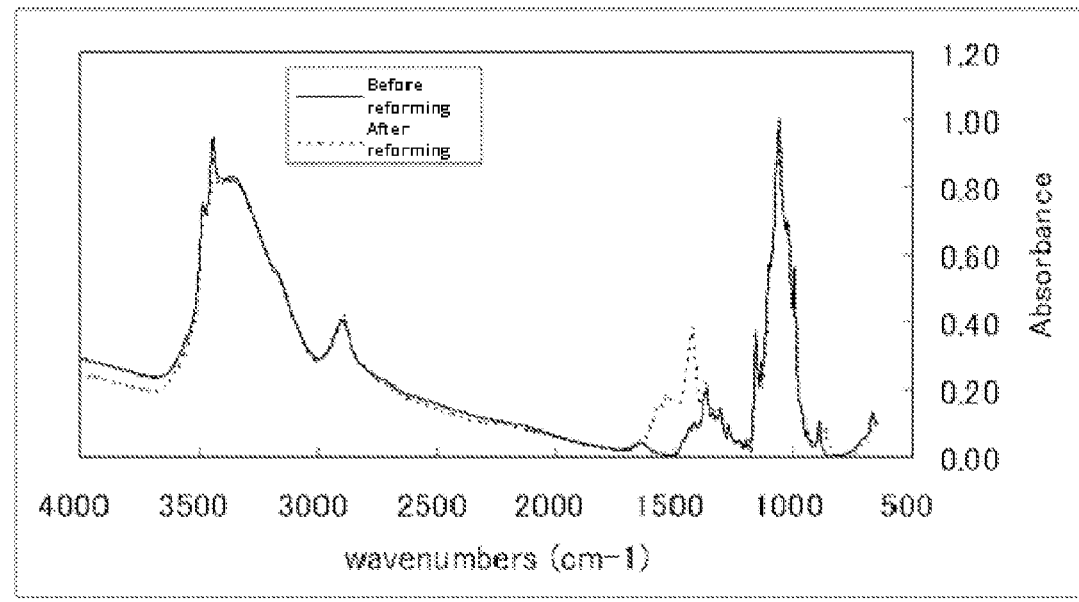
FIG. 1 illustrates IR spectrum of an untreated separator (Comparative Example) and IR spectrum of a treated separator (Example 1)

Without a treatment to create carbon-carbon double bonds, cellulose has no carbon-carbon double bonds in its molecule. Via the treatment, carbon-carbon double bonds are created in cellulose, wherein —$CH_2OH$ groups of cellulose are subjected to dehydration, creating C=C bonds, for example. The creation of C=C bonds in cellulose can be confirmed by IR spectrum, for example, wherein carbon-carbon double bond-introduced cellulose shows a peak spectrum at about 1522 $cm^{-1}$ which indicates stretching vibration of C=C and a peak spectrum at about 1423 $cm^{-1}$ which indicates bending vibration of C—C—C. In some embodiments, carbon-carbon double bond-introduced cellulose shows a peak spectrum at 1522 $cm^{-1}$ whose absorbance is as intense as about a half of the absorbance of the peak spectrum at 1423 $cm^{-1}$.

The separator for the lithium ion capacitor proposed by the present invention contains cellulose that has been given a treatment to create carbon-carbon double bonds. The treatment method to create carbon-carbon double bonds in cellulose is not specifically limited and any method can be used as long as it can create carbon-carbon double bonds in cellulose. Treatment methods to create carbon-carbon double bonds in cellulose include, for example, alkali treatment involving soaking and heat-treating of cellulose in alkali solution, and heat treatment.

Alkali treatment of cellulose is performed by, for example, soaking, in a 1.0-M aqueous sodium hydroxide solution, a known structure constituted by a known material that contains natural cellulose and can be applied for lithium ion capacitors, and then heat-treating the structure at 60° C. For the alkali solution, alkali solution prepared using lithium hydroxide, etc., can also be used instead of sodium hydroxide, where the solution preferably has a concentration of 0.1 M to 2 M. The heating temperature is preferably 40° C. to 80° C. The heating time is preferably 30 minutes to 24 hours.

In the case of heat treatment, on the other hand, a known structure constituted by a known material that contains cellulose and can be applied for lithium ion capacitors is heated to a temperature of 100° C. to 280° C. in atmosphere, inert gas or under decompression. Examples of the inert gas include nitrogen and argon, among others. The decompression environment is 1000 Pa or less, for example, where the preferable pressures are 100 to 200 Pa. The heating time is preferably 30 minutes to 24 hours. More preferable heat treatment conditions are heating at 170° C. to 190° C. in atmosphere under decompression (100 to 200 Pa) for 10 hours. Heat treatment can be given before or after winding the separator.

The separator for the lithium ion capacitor proposed by the present invention may contain other fiber in addition to cellulose that has been given a treatment to create carbon-carbon double bonds. Examples of such other fiber include, but are not limited to, polypropylene, polyethylene, fluororesin, polyolefin, polyester, polyamide, polyamide imide, polyether, polybenzoimidazole and glass fiber. The cellulose content in the separator for the lithium ion capacitor proposed by the present invention is 50 percent by volume to 100 percent by volume.

The separator for the lithium ion capacitor proposed by the present invention can be formed by the paper-making method using a material containing cellulose. The aforementioned treatment to create carbon-carbon double bonds in cellulose may be given to the material before paper-making, or to a material containing cellulose that has not been given a treatment to create carbon-carbon double bonds can be put through the paper-making process and then the structure thus formed can be given a treatment to create carbon-carbon double bonds.

The thickness of the separator for the lithium ion capacitor proposed by the present invention is preferably 10 to 80 µm, or more preferably 20 to 50 µm. The density of the separator for the lithium ion capacitor proposed by the present invention is preferably 0.3 to 0.9 g/cm$^3$, or more preferably 0.5 to 0.8 g/cm$^3$ (density is measured by the dimension method). The average pore size of the separator for the lithium ion capacitor proposed by the present invention is preferably 1 to 10 µm, or more preferably 3 to 6 µm. Under the present invention, the average pore size is obtained by observing the separator using a scanning electron microscope and then statistically processing the observed image. The void ratio of the separator for the lithium ion capacitor proposed by the present invention is preferably 40 to 80%, or more preferably 60 to 70% (void is measured according to the formula {Fiber density−(Weight/Thickness)}/Fiber density).

(Lithium Ion Capacitor)

The lithium ion capacitor proposed by the present invention is a lithium ion capacitor having a positive electrode, a negative electrode, a separator and an electrolyte solution, wherein the separator contains cellulose that has been given a treatment to create carbon-carbon double bonds. The positive electrode and negative electrode are generally formed by placing, in a collector, an electrode active material layer that contains an electrode active material as an essential component.

A lithium ion capacitor having a wound storage unit and a film package that serves as a container to accommodate a non-aqueous electrolyte solution is explained below as one embodiment of the present invention, but the present invention is not at all limited to the foregoing. The wound storage unit is formed by putting, on top of each other with a band-shaped separator in between, a positive electrode having a polarizable active material layer provided on one side of a band-shaped positive electrode collector in the thickness direction and a negative electrode having an active material layer capable of adsorbing and desorbing lithium ions provided on one side of a band-shaped negative electrode collector in the thickness direction and then winding them together.

The positive electrode can have a known structure constituted by a known material that can be applied for a lithium ion capacitor's positive electrode, and can be prepared using a known method. The positive electrode collector is constituted by, for example, an aluminum sheet material having multiple through holes. The polarizable electrode layer of the positive electrode can contain carbide made of polyacene (PAS), active carbon or other active material, for example, and it can also contain carbon black, graphite, metal powder or other conductivity auxiliary, as well as polytetrafluoroethylene (PTFE), polyvinylidene fluoride (PVdF) or other co-polymer binder, etc., if necessary.

The positive electrode has one end of the positive electrode terminal attached to it by means of needle clinching. The positive electrode terminal is made of metal material and attached on the side of the positive electrode collector different from the side on which the polarizable active material layer is provided in the thickness direction. The positive electrode terminal can be attached by welding or any other known method for attaching terminals, in addition to needle clinching. The other end of the positive electrode terminal projects from one end of the positive electrode in the width direction.

The negative electrode can have a known structure constituted by a known material that can be applied for a lithium ion capacitor's negative electrode, and can be prepared using a known method. The negative electrode collector is constituted by, for example, a copper sheet material having multiple through holes. The negative electrode collector can also use stainless steel, nickel, or other material besides copper, and any known material used for a lithium ion capacitor's negative electrode can be used. The active material layer of the negative electrode can have polyacene (PAS), any of various carbon materials, silver oxide, silicon oxide, or other active material, for example, and it can also contain carbon black, metal powder, or other conductivity auxiliary, as well as polyvinylidene fluoride (PVdF), styrene butadiene (SBR), or other binder, etc., if necessary. Examples of the carbon materials include natural graphite, artificial graphite, coke, non-graphitizable carbon, and graphitizable carbon, and the like.

The negative electrode has one end of the negative electrode terminal attached to it by means of needle clinching. The negative electrode terminal is made of metal material and attached on the side of the negative electrode collector different from the side on which the active material layer is provided in the thickness direction. The negative electrode terminal can be attached by welding or any other known method for attaching terminals, in addition to needle clinching. The other end of the negative electrode terminal projects from one end of the negative electrode in the width direction. The surface area on one end of the negative electrode terminal not contacting the negative electrode collector may be covered with a protective film constituted by polyimide adhesive tape, etc.

The electrolyte solution is made by dissolving an electrolyte in a non-protonic, non-aqueous solvent. Examples of the non-protonic, non-aqueous solvent include cyclic carbonic acid ester, chained carbonic acid ester, cyclic ester, cyclic ether, chained ether, nitriles, sulfur-containing compounds, and the like. Any of these non-aqueous solvents may be used alone or multiple types may be combined and used as a mixed solvent. The electrolyte is a non-aqueous electrolyte solution containing Li$^+$ as an electrolytic cationic component, and PF$_6$, BF$_4$, etc., as an electrolytic anionic component. Preferable electrolytes include LiPF$_6$, LiBF$_4$, LiAsF$_6$, LiClO$_4$ and LiI, among others.

EXAMPLES

Example 1 and Comparative Example

Preparation of Separator That Has Been Given a Treatment to Create Carbon-Carbon Double Bonds A separator of 45 mm in width, 44 cm in length and 50 μm in thickness (constituted by cellulose fiber and having a fiber size of 0.5 to 5 μm, density of 0.5 g/cm$^3$, average pore size of 1 to 10 μm and void ratio of 67%) was soaked in 1.0-M aqueous sodium hydroxide solution and heated at 60° C. for 10 hours. An IR spectrum of the untreated separator (Comparative Example (before reforming)) and IR spectrum of the treated separator (Example 1 (after reforming)) are shown in FIG. 1. FIG. 1 shows that the above treatment created carbon-carbon double bonds in the cellulose (near 1522 cm$^{-1}$ and 1423 cm$^{-1}$).

Preparation of Lithium Ion Capacitor

A wound storage unit was prepared by putting a positive electrode and negative electrode one on top of the other with a separator in between, in the direction of allowing the active material layers of the positive electrode and negative electrode to face each other. The positive electrode was formed as follows. First, active carbon equivalent to 2000 m$^2$/g in specific surface area was mixed with, relative to 100 parts by weight of active carbon, 5 parts by weight of carbon black as a conductive auxiliary and 10 parts by weight of PTFE (polytetrafluoroethylene) as a binder, and then the mixture was rolled and formed into a sheet. Next, the formed sheet was attached on one side of an aluminum sheet material (having aluminum purity of 99.9% or more, thickness of 50 μm and etched foil) with multiple through holes in the thickness direction, after which a positive electrode band was cut out from the sheet (to 30 mm in width and 40 cm in length). The negative electrode was formed as follows. First, non-graphitizable carbon constituted by phenolic resin was mixed with, relative to 100 parts by weight of non-graphitizable carbon, 5 parts by weight of carbon black as a conductive auxiliary, and 8 parts by weight of PVdF (polyvinylidene fluoride) as a binder and made into a paste. Next, the paste was applied and dried on one side of the copper sheet material (of 15 mm in thickness and 20% in opening ratio) in the thickness direction, after which a negative electrode band was cut out from the sheet (to 35 mm in width and 41 cm in length). For the separator, both an untreated separator (Comparative Example) and treated separator (Example 1) were used. A lithium metal sheet was attached on the negative electrode collector side of the negative electrode. The attached metal lithium sheet had a width of 20 mm, length of 40 mm and thickness of 100 μm.

Next, the wound storage unit and non-aqueous electrolyte solution were stored in a package. For the non-aqueous electrolyte solution, 1.0-M LiPF$_6$/PC (propylene carbonate) was used. When the wound storage unit and non-aqueous electrolyte solution were stored in the package, the active material layer of the negative electrode of the wound storage unit made electrochemical contact with the lithium metal sheet, and lithium ions dissolved from the lithium metal sheet into the non-aqueous electrolyte solution were doped to the active material layer of the negative electrode. This doping is called "pre-doping."

The lithium ion capacitor thus prepared charges/discharges at the negative electrode by means of adsorption and desorption of lithium ions to/from the active material layer, and charges/discharges at the positive electrode through the electrical double layers present at the interface between the polarizable electrode layer and non-aqueous electrolyte solution.

Charge/Discharge Test

Figure 2:
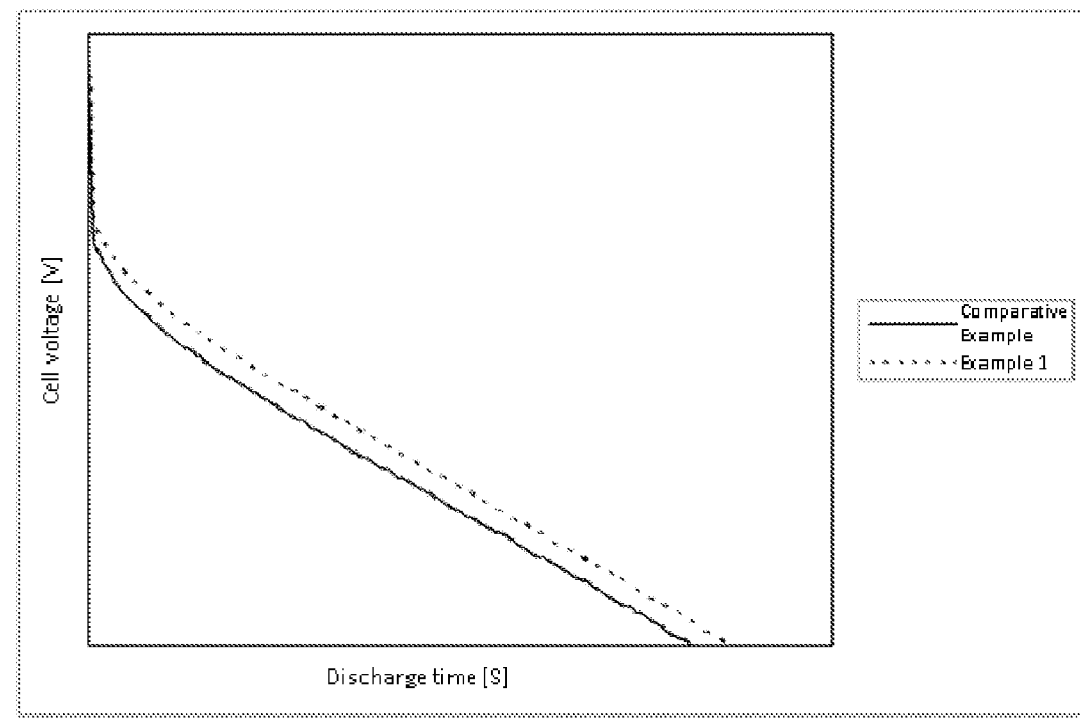
FIG. 2 is illustrates discharge curves of lithium ion capacitors in Example 1 and Comparative Example.

The capacitor was charged to 3.8 V at 5 A, held in this condition for 10 minutes, and then discharged to 2.2 V at 5 A. The obtained discharge curve was used to calculate the internal resistance according to the discharge-starting-point internal resistance measurement method. The result is shown in FIG. 2. The lithium ion capacitor using the separator that has been given a treatment to create carbon-carbon double bonds in cellulose (Example 1) had internal resistance approx. 18% lower than that of the lithium ion capacitor using the untreated separator (Comparative Example), thus reducing energy loss in the event of large current discharge.

Examples 2 to 5

A lithium ion capacitor was prepared in the same manner as in Example 1 above, except that the alkali treatment conditions of the separator were changed as shown in Table 1. A charge/discharge test was conducted in the same manner as in Example 1. Table 1 shows the voltage drops and direct-current resistances.

TABLE 1

| | | Alkali treatment | | Discharged at 5 A | |
|---|---|---|---|---|---|
| | Separator component | Temperature [° C.] | Time [h] | Voltage drop [V] | Direct-current resistance [Ω] |
| Example 1 | Cellulose | 60 | 10 | 0.466 | 0.093 |
| Example 2 | Cellulose | 60 | 5 | 0.478 | 0.096 |
| Example 3 | Cellulose | 50 | 5 | 0.502 | 0.100 |
| Example 4 | Cellulose | 40 | 10 | 0.508 | 0.102 |
| Example 5 | Cellulose | 60 | 3 | 0.472 | 0.094 |
| Comparative Example | Cellulose | None | None | 0.530 | 0.106 |

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, an article "a" may refer to a species or a genus including multiple species, and "the invention" or "the present invention" may refer to at least one of the embodiments or aspects explicitly, necessarily, or inherently disclosed herein. In this disclosure, any defined meanings do not necessarily exclude ordinary and customary meanings in some embodiments.

The present application claims priority to Japanese Patent Application No., 2011-247657 filed Nov. 11, 2011, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A separator for a lithium ion capacitor, comprising cellulose that has been given a treatment to create carbon-carbon double bonds in its molecule.

2. A separator for a lithium ion capacitor according to claim 1, wherein the cellulose is contained in an amount of 50% to 100% by volume.

3. A separator for a lithium ion capacitor according to claim 1, which has a thickness of 10 µm to 80 µm.

4. A separator for a lithium ion capacitor according to claim 1, which has a density of 0.3 g/cm$^3$ to 0.9 g/cm$^3$.

5. A separator for a lithium ion capacitor according to claim 1, which has an average pore size of 1 µm to 10 µm.

6. A separator for a lithium ion capacitor according to claim 1, which has a void ratio of 40% to 80%.

7. A lithium ion capacitor comprising a positive electrode, a negative electrode, a separator, and an electrolyte solution, wherein the separator comprises cellulose that has been given a treatment to create carbon-carbon double bonds in its molecule.

8. A lithium ion capacitor according to claim 7, wherein the cellulose is contained in the separator in an amount of 50% to 100% by volume.

9. A lithium ion capacitor according to claim 7, wherein the separator has a thickness of 10 µm to 80 µm.

10. A lithium ion capacitor according to claim 7, wherein the separator has a density of 0.3 g/cm$^3$ to 0.9 g/cm$^3$.

11. A lithium ion capacitor according to claim 7, wherein the separator has an average pore size of 1 µm to 10 µm.

12. A lithium ion capacitor according to claim 7, wherein the separator has a void ratio of 40% to 80%.

* * * * *